Dec. 13, 1955             H. I. McCAIN             2,726,586

FILM MAGAZINE MOUNTING FOR CAMERAS

Filed Oct. 18, 1954             3 Sheets-Sheet 1

INVENTOR.
Homer Ivy McCain
BY Otto A. Earl
ATTORNEY.

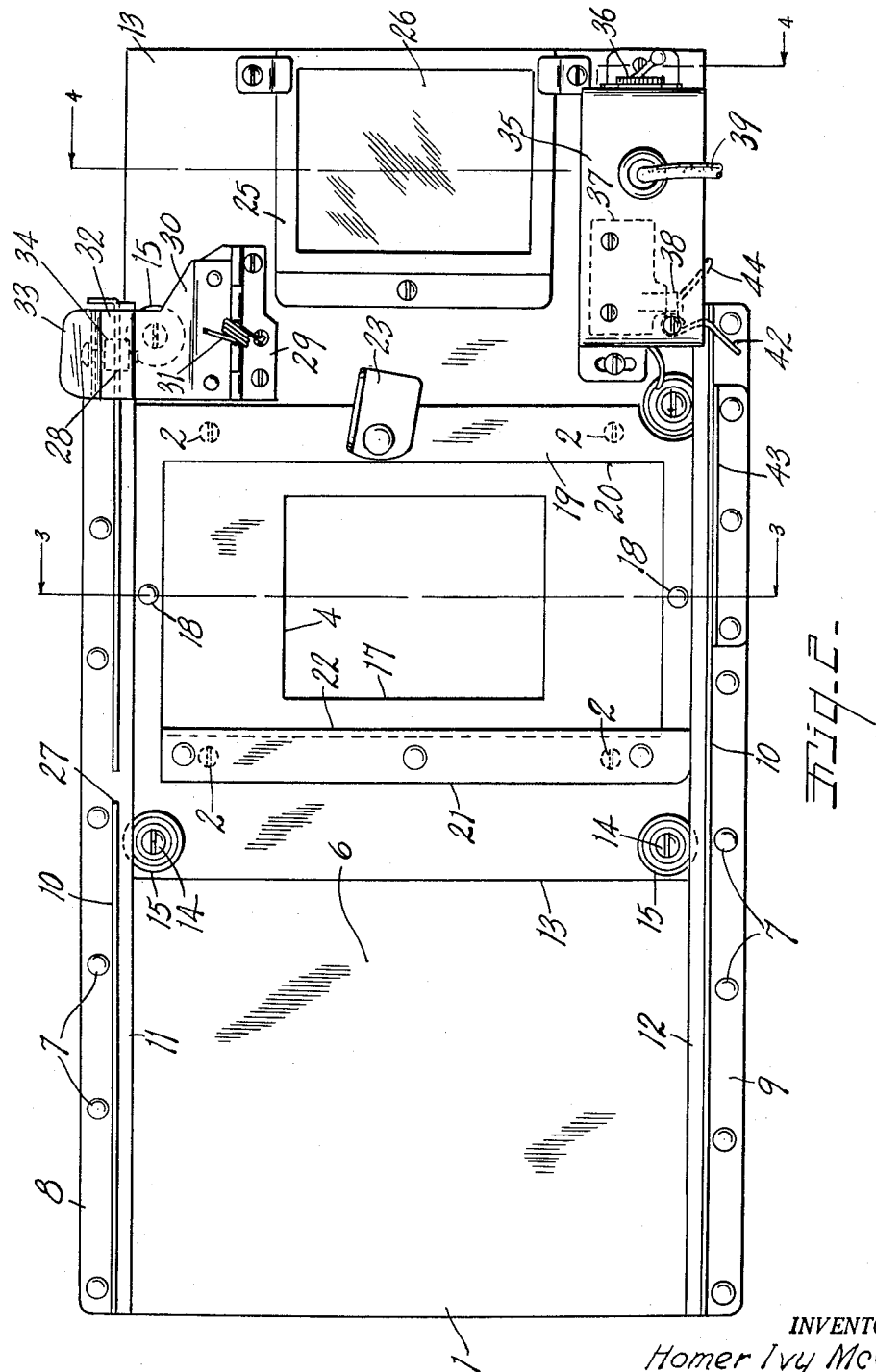

Dec. 13, 1955 H. I. McCAIN 2,726,586
FILM MAGAZINE MOUNTING FOR CAMERAS
Filed Oct. 18, 1954 3 Sheets-Sheet 3
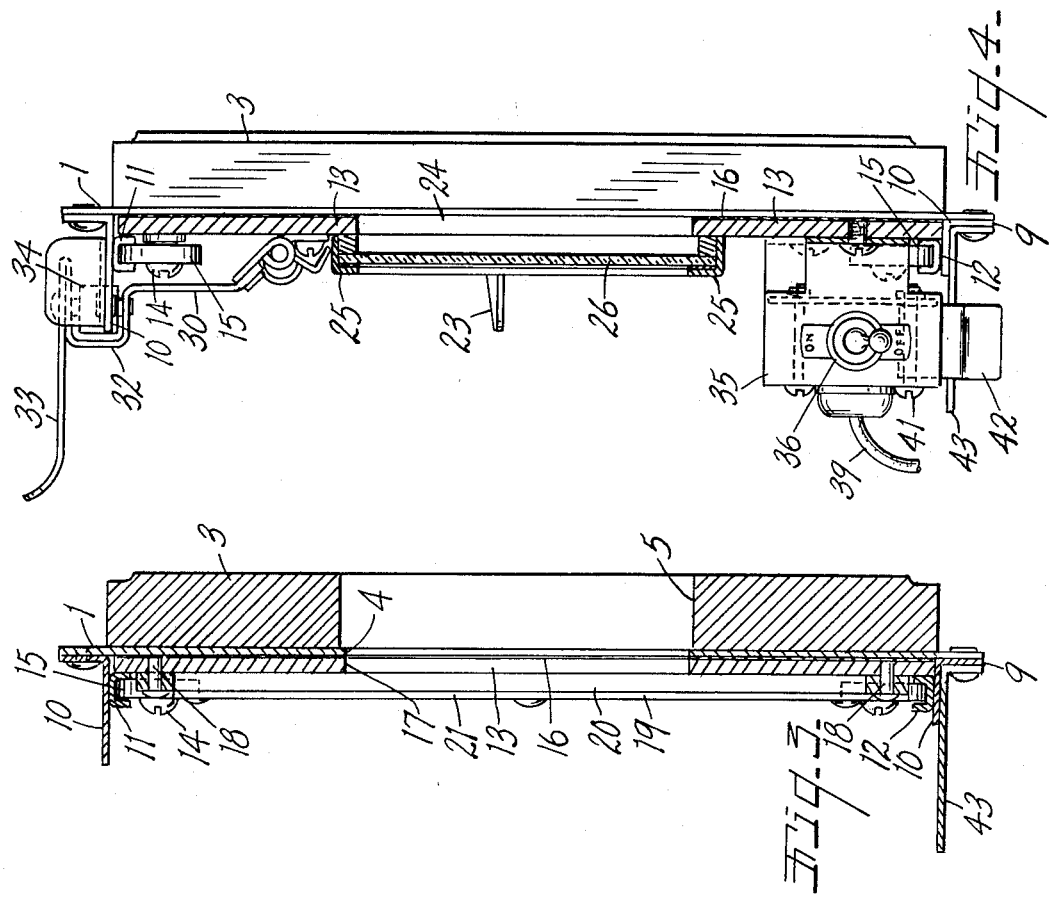
INVENTOR.
Homer Ivy McCain
BY
ATTORNEY.

United States Patent Office 2,726,586
Patented Dec. 13, 1955

2,726,586

FILM MAGAZINE MOUNTING FOR CAMERAS

Homer Ivy McCain, Traverse City, Mich.

Application October 18, 1954, Serial No. 462,642

7 Claims. (Cl. 95—49)

This invention relates to improvements in film magazine mounting for cameras. The principal objects of this invention are:

First, to provide an attachment for cameras which will permit an automatic film feeding magazine to be movably mounted on the camera so that the magazine can be shifted between operative picture taking position and inoperative view finding position and so that the film advancing mechanism of the magazine is automatically actuated by movement of the magazine out of operative picture taking position.

Second, to provide an attachment for cameras which will permit the use of automatic film feeding magazines with relatively inexpensive cameras.

Third, to provide a relatively simple and inexpensive but solid support for an automatic film magazine to permit slidable adjustment of the magazine relative to the back of a camera.

Other objects and advantages of the invention will be apparent from a consideration of the following description and claims.

Fig. 2 is a rear elevational view of the magazine support with the magazine removed.

Fig. 3 is a vertical cross sectional view taken along the plane of the line 3—3 in Fig. 2.

Fig. 4 is a vertical cross sectional view taken along the plane of the line 4—4 of Fig. 2.

Figure 1:
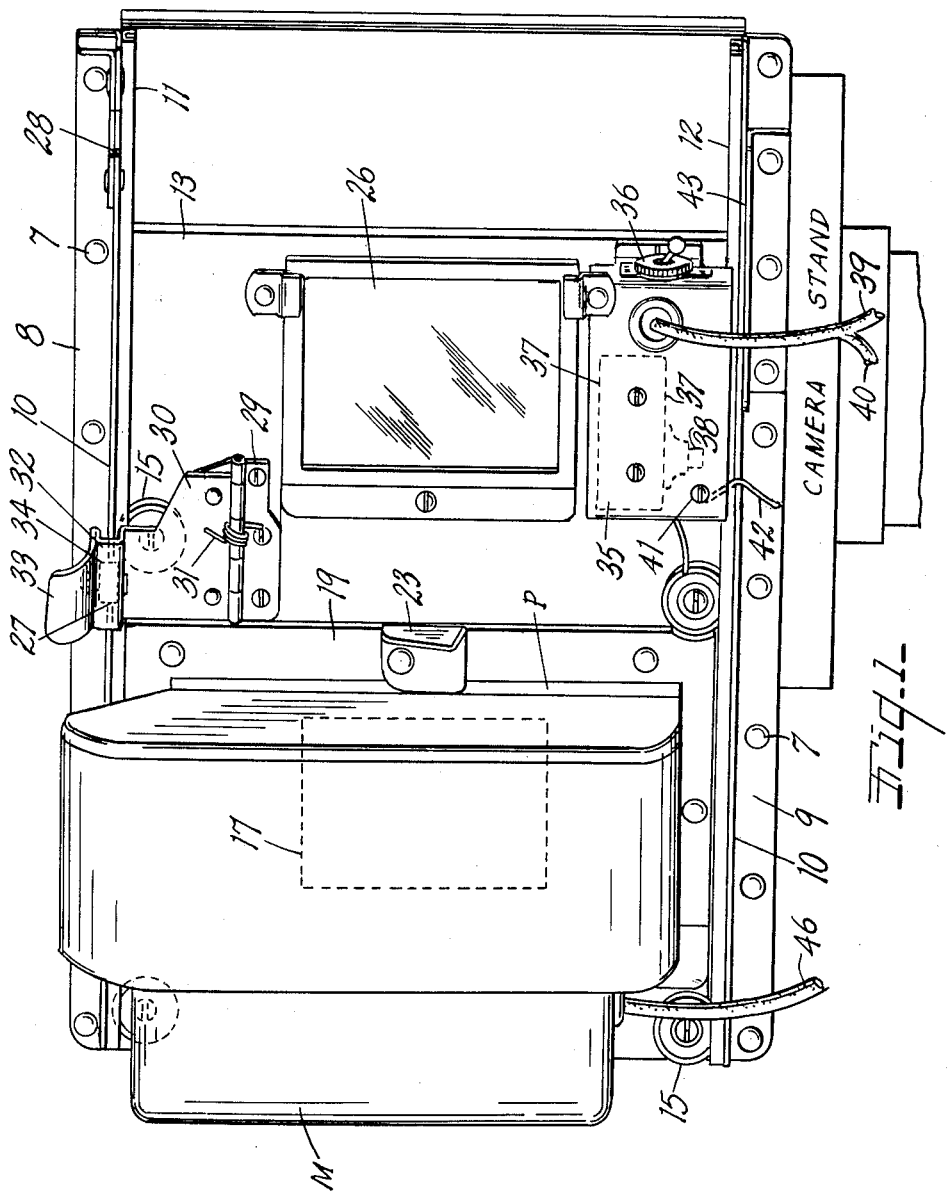
Fig. 1 is a perspective view of the back of a camera with the film magazine and magazine support of the present invention mounted therein.

There are presently available automatic feeding film magazines designed for use with relatively expensive cameras of the single view portrait type. The present invention provides structure by means of which these automatic film magazines may be employed in connection with less expensive standard portrait cameras. The drawings generally illustrate an automatic magazine at M and since this magazine is a commercially available article no attempt is made to illustrate the details thereof other than to point out that it is provided with a laterally projecting mounting plate P on its forward face.

The magazine support of the present invention comprises a flat base plate 1 adapted to be secured as by means of the screws 2 (see Fig. 2) to the back 3 of a portrait camera. The plate 1 has a picture aperture 4 formed therein to register with the picture aperture 5 in the camera back. The plate 1 projects laterally from the aperture 4 a substantial distance to provide a masking area 6.

Secured along the upper and lower edges of the base plate 1 as by rivets 7 are angle members 8 and 9 having rearwardly projecting flanges 10. Secured in opposed relationship on the inner sides of the flanges 10 and in spaced relationship with the back of the plate 1 are U shaped rails 11 and 12. A carriage plate 13 is slidably mounted between the base plate and the forward surfaces of the rails 11 and 12. Studs 14 projecting rearwardly from the carriage plate rotatably support rollers 15 that travel in the U-shaped rails. A layer of felt or soft material 16 is interposed between the adjacent faces of the base plate and carriage plate to provide a light seal around the aperture 4. The carriage plate is provided in one side with a picture aperture 17 adapted to register with the aperture in the base plate as is shown in Figs. 2 and 3.

Secured to the back surface of the carriage plate as by rivets 18 is a socket forming plate 19 which has an opening 20 formed therein of substantially larger area than the picture aperture 17. A strip 21 secured along one edge of the socket plate overhangs the edge of the socket opening to provide a lip 22 behind which one edge of the mounting plate P on the magazine may be engaged. A catch 23 pivoted on the other side of the socket plate is swingable into locking engagement with the plate P as shown in Fig. 1 to releasably retain the film magazine on the carriage plate. It will be understood that the magazine M is provided with mechanism for automatically feeding film past the picture aperture 17 in the carriage plate.

To the right of the socket plate 19 the carriage plate 13 is provided with a view finding aperture 24 and flanged retaining strips 25 securing a translucent viewing screen 26 over the viewing aperture. The viewing aperture 24 and the picture aperture 17 are so spaced in the carriage plate that the viewing aperture 24 is in registry with the picture aperture 4 in the base plate when the picture aperture 17 in the carriage plate is in registry with the masking area 6 of the base plate.

In order to properly locate the carriage plate and the apertures therein with respect to the base plate the rearwardly projecting flange 10 of the upper angle member 8 is provided with rearwardly opening notches at 27 and 28 (see Figs. 1 and 2). A hinge member has one leaf 29 secured to the carriage plate while its upper movable leaf 30 is biased toward the upper angle member 8 by the coil spring 31. The upper end of the hinge leaf 30 is bent into a channel 32 and provided with a finger piece 33. A locking roller 34 mounted in the channel rides along the edge of the flange 10 and drops into the notches 27 and 28 when the carriage plate is in either of its adjusted positions.

In order to automatically actuate the film magazine M the carriage plate is provided with a switch housing 35 mounted below the viewing screen 26. The housing supports and encloses a manually operable switch 36 and a minimum movement switch 37 having a depending actuating plunger 38. The switches 36 and 37 are connected in series with a supply conductor 39 and a conductor 40 adapted to be connected to the magazine M. Pivotally supported in the switch housing 35 at 41 and depending therebelow is an angled trigger element 42. The trigger element 42 is adapted to engage the ends of an angle shaped abutment 43 secured to the bottom angle member 9 as the carriage plate and switch housing are moved laterally on the base plate. As is indicated by the dotted lines at 44 in Fig. 2 the trigger element will move up into actuating engagement with the switch actuator 38 as the carriage plate is moved to the left and as the picture aperture 17 moves out of registry with the picture aperture 4 in the base plate. Closing of the switch 37 triggers the automatic magazine to advance a new film into registry with the picture aperture 17. On reverse movement of the carriage plate to the right the trigger element 42 merely swings upwardly to the left over the abutment 43 without actuating the switch 37.

Various modifications and changes in the structural details described which fall within the scope of the following claims may be made without departing from the spirit of the invention.

Having thus described the invention, what is claimed to be new and what is desired to be secured by Letters Patent is:

1. A film magazine suport for a camera comprising, a base plate having a portion adapted to be fixedly secured to the back of a camera and projecting laterally to one side of said portion for a substantial distance, angle members having one flange secured along the top and bottom of said plate with their other flanges projecting rearwardly, opposed U-shaped rails secured to the inner sides of said rearwardly projecting flanges, a carriage plate slidably mounted between the forward sides of said rails and the rear face of said base plate, a felt light seal carried by said carriage plate between said plates, supporting rollers carried by said carriage plate and guidingly supported in said rails, said base plate having a picture aperture formed in one side thereof and said carriage plate having laterally spaced picture and viewing apertures formed therein arranged to alternately register with the aperture in said base plate with the picture aperture in the carriage plate registering with an imperforate portion of the base plate when the viewing aperture is in registry with the base plate aperture, a socket forming plate secured to said carriage plate and having an opening embracing a substantial area around the picture aperture in the carriage plate, a strip secured to said socket plate and forming an overhanging lip along one edge of said opening, a latch on said socket plate swingable into locking engagement with a magazine engaged behind said lip, a translucent plate secured over said viewing aperture, a spring biased catch hingedly secured to the upper portion of said carriage plate and having a roller disposed to ride along the rear edge of the upper angle member, said upper angle member having located notches therein to receive said last roller when the apertures in said carriage plate register with the aperture in said base plate, a switch housing secured to the bottom of said carriage plate and projecting over said bottom angle member, a manual switch and a minimum movement automatic switch mounted in said housing and connected in series with a supply conductor, a control conductor connected to said automatic switch and adapted to be connected to a film magazine mounted on said carriage plate, a trigger element pivoted on said housing and depending therebelow, and an angle shaped abutment secured to the bottom angle member on the bottom of said base plate in the path of said trigger element to move said trigger element into actuating contact with said automatic switch as the picture aperture in said carriage plate moves out of registry with the aperture in said base plate.

2. A film magazine support for a camera comprising, a base plate having a portion adapted to be fixedly secured to the back of a camera and projecting laterally to one side of said portion for a substantial distance, angle members having one flange secured along the top and bottom of said plate with their other flanges projecting rearwardly, opposed U-shaped rails secured to the inner sides of said rearwardly projecting flanges, a carriage plate slidably mounted between the forward sides of said rails and the rear face of said base plate, a felt light seal between said plates, supporting rollers carried by said carriage plate and guidingly supported in said rails, said base plate having a picture aperture formed in one side thereof and said carriage plate having laterally spaced picture and viewing apertures formed therein arranged to alternately register with the aperture in said base plate with the picture aperture in the carriage plate registering with an imperforate portion of the base plate when the viewing aperture is in registry with the base plate aperture, a socket forming plate secured to said carriage plate and having an opening embracing a substantial area around the picture aperture in the carriage plate, an overhanging lip along one edge of said opening, a latch on said socket plate swingable into locking engagement with a magazine engaged behind said lip, a translucent plate secured over said viewing aperture, a spring biased catch hingedly secured to the upper portion of said carriage plate and having a roller disposed to ride along the rear edge of the upper angle member, said upper angle member having locating notches therein to receive said last roller when the apertures in said carriage plate register with the aperture in said base plate, a switch housing secured to the bottom of said carriage plate and projecting over said bottom angle member, a manual switch and an automatic switch mounted in said housing and connected in series with a supply conductor, a control conductor connected to said automatic switch and adapted to be connected to a film magazine mounted on said carriage plate, a trigger element pivoted on said housing and depending therebelow, and an abutment on the bottom of said base plate in the path of said trigger element to move said trigger element into actuating contact with said automatic switch as the picture aperture in said carriage plate moves out of registry with the aperture in said base plate.

3. A film magazine support for a camera comprising, a base plate having a portion adapted to be fixedly secured to the back of a camera and projecting laterally to one side of said portion for a substantial distance, flanges along the top and bottom of said plate projecting rearwardly, opposed rails secured to the inner sides of said rearwardly projecting flanges, a carriage plate slidably mounted between the forward sides of said rails and the rear face of said base plate, a felt light seal between said plates, supporting rollers carried by said carriage plate and guidingly supported by said rails, said base plate having a picture aperture formed in one side thereof and said carriage plate having laterally spaced picture and viewing apertures formed therein arranged to alternately register with the aperture in said base plate with the picture aperture in the carriage plate registering with an imperforate portion of the base plate when the viewing aperture is in registry with the base plate aperture, a socket forming plate secured to said carriage plate and having an opening embracing a substantial area around the picture aperture in the carriage plate, an overhanging lip along one edge of said opening, a latch on said socket plate swingable into locking engagement with a magazine engaged behind said lip, a translucent plate secured over said viewing aperture, a spring biased catch hingedly secured to the upper portion of said carriage plate and having a portion disposed to ride along the rear edge of the upper flange, said upper flange having locating notches therein to receive said catch when the apertures in said carriage plate register with the aperture in said base plate, a switch housing secured to the bottom of said carriage plate and projecting over said bottom flange, a manual switch and an automatic switch mounted in said housing and connected in series with a supply conductor, a control conductor connected in series with said switches and adapted to be connected to a film magazine mounted on said carriage plate, a trigger element pivoted on said housing and depending therebelow, and an abutment on said base plate in the path of said trigger element to move said trigger element into actuating contact with said automatic switch as the picture aperture in said carriage plate moves out of registry with the aperture in said base plate.

4. A film magazine support for a camera comprising, a base plate having a portion adapted to be fixedly secured to the back of a camera and projecting laterally to one side of said portion for a substantial distance, flanges along the top and bottom of said plate projecting rearwardly, opposed rails on the inner sides of said rearwardly projecting flanges, a carriage plate slidably mounted between the forward sides of said rails and the rear face of said base plate, a light seal between said plates, supporting rollers carried by said carriage plate and guidingly supported by said rails, said base plate having a picture aperture formed in one side thereof and said carriage plate having laterally spaced picture and viewing apertures formed therein arranged to alternately register with the aperture in said base plate with the picture aperture in the carriage plate registering with an imperforate portion of the base plate when the viewing aperture is in registry with the base plate aperture, a socket forming plate secured to said carriage plate and having an opening embracing a substantial area around the picture aperture in the carriage plate, an overhanging lip along one edge of said opening, a latch on said socket plate swingable into locking engagement with a magazine engaged behind said lip, a translucent plate secured over said viewing aperture, a spring biased catch hingedly secured to said carriage plate and having a portion disposed to ride along the rear edge of one of said flanges, said one flange having locating notches therein to receive said catch when the apertures in said carriage plate register with the aperture in said base plate, a switch housing secured to said carriage plate, a manual switch and a minimum movement automatic switch mounted in said housing and connected in series with a supply conductor, a control conductor connected in series with said switches and adapted to be connected to a film magazine mounted on said carriage plate, a trigger element pivoted on said housing and depending therebelow, and an abutment secured to said base plate in the path of said trigger element to move said trigger element into actuating contact with said automatic switch as the picture aperture in said carriage plate moves out of registry with the aperture in said base plate.

5. A film magazine support for a camera comprising, a base plate having a portion adapted to be fixedly secured to the back of a camera and projecting laterally to one side of said portion for a substantial distance, flanges along the top and bottom of said plate projecting rearwardly, a carriage plate slidably mounted between said flanges to slide along the rear face of said base plate, a light seal between said plates, said base plate having a picture aperture formed in one side thereof and said carriage plate having laterally spaced picture and viewing apertures formed therein arranged to alternately register with the aperture in said base plate with the picture aperture in the carriage plate registering with an imperforate portion of the base plate when the viewing aperture is in registry with the base plate aperture, means for removably securing a film magazine on said carriage plate in registry with the picture aperture in the carriage plate, a translucent plate secured over said viewing aperture, a spring biased catch movably secured to said carriage plate and having a portion disposed to ride along the rear edge of one of said flanges, said one flange having locating notches therein to receive said catch when the apertures in said carriage plate register with the aperture in said base plate, a switch housing secured to said carriage plate, a manual switch and a minimum movement automatic switch mounted in said housing and connected in series with a supply conductor, a control conductor connected in series with said switches and adapted to be connected to a film magazine mounted on said carriage plate, a trigger element pivoted on said housing and depending therebelow, and an abutment secured to said base plate in the path of said trigger element to move said trigger element into actuating contact with said automatic switch as the picture aperture in said carriage plate moves out of registry with the aperture in said base plate.

6. An attachment for a camera comprising, a plate adapted to be secured over the back of the camera and to project to one side thereof and having an opening registering with the back of the camera, a carriage slidably mounted on the back of said plate and having a picture aperture adapted to register with said opening, means for removably securing a film magazine to said carriage in registry with the picture aperture therein, coacting spring pressed catch and keeper elements on said plate and carriage adapted to releasably lock said plate and carriage with said picture aperture in registering and nonregistering relation with said opening, a translucent viewing screen carried by said carriage to register with said opening when said picture aperture is out of registry with said opening, an electrical switch carried by said carriage, a trigger element pivoted on said carriage adjacent said switch, a projection on said plate engageable with said trigger element to move said element into actuating engagement with said switch as said aperture is moved out of registry with said opening, and an electrical conductor connected to said switch and adapted to be connected to a film magazine mounted on said carriage.

7. An attachment for a camera comprising, a plate member adapted to be secured over the back of the camera and to project to one side thereof and having an opening registering with the back of the camera, a carriage member slidably mounted on the back of said plate and having a picture aperture adapted to register with said opening, means for removably securing a film magazine to said carriage in registry with the picture aperture therein, coacting stops on said plate and carriage adapted to locate said plate and carriage with said picture aperture in registering and non-registering relation with said opening, a translucent viewing screen carried by said carriage to register with said opening when said picture aperture is out of registry with said opening, an electrical switch carried by one of said members, a trigger element pivoted on said one of said members adjacent said switch, a projection on the other of said members engageable with said trigger element to move said element into actuating engagement with said switch as said aperture is moved out of registry with said opening, and an electrical conductor connected to said switch and adapted to be connected to a film magazine mounted on said carriage.

No references cited.